Dec. 14, 1948.    R. E. PRICE    2,456,431
VALVE MEANS TO COMPENSATE FOR VISCOSITY
IN HYDRAULIC SYSTEMS
Filed Nov. 8, 1940
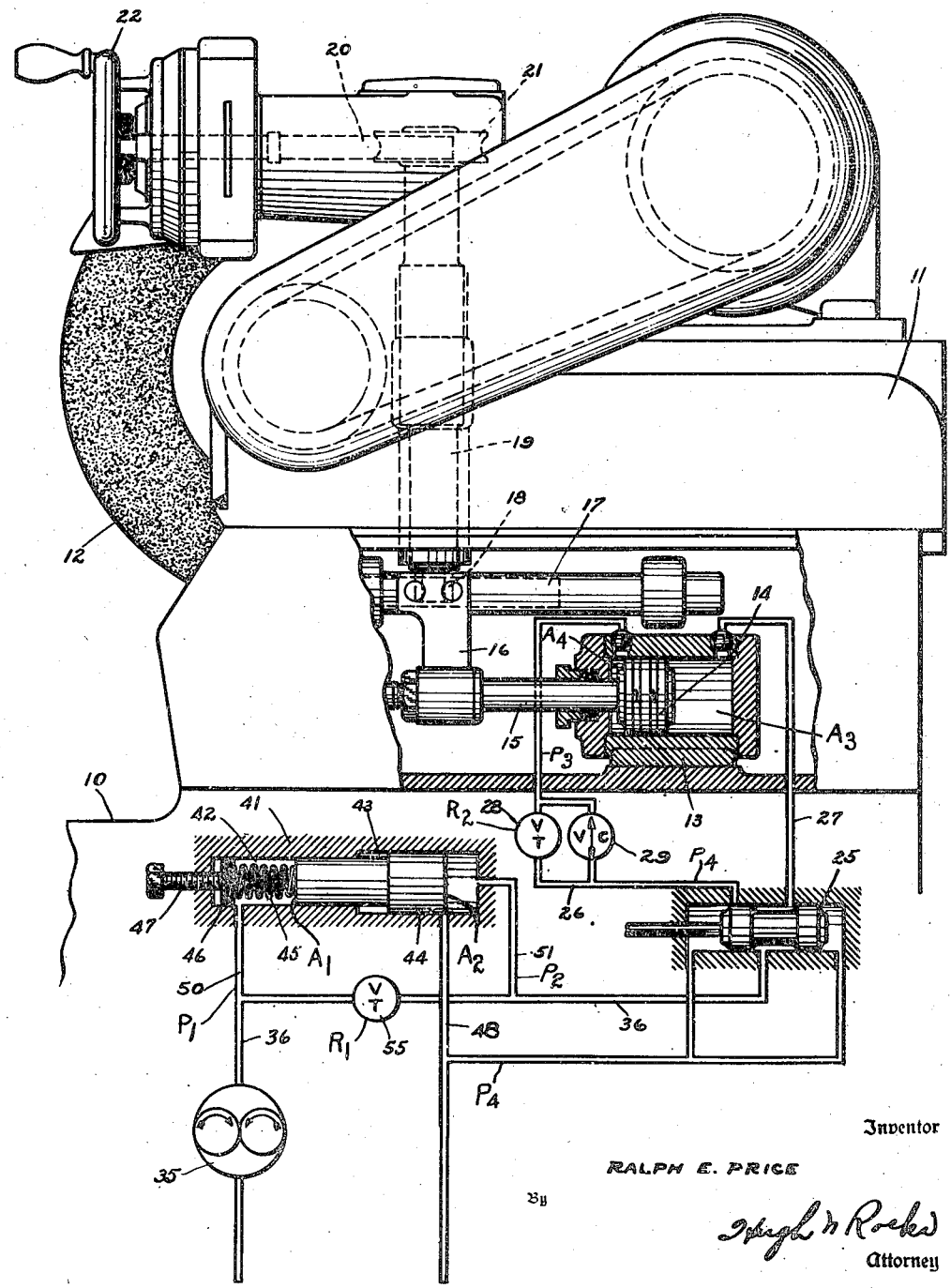
Inventor
RALPH E. PRICE
By
Attorney Patented Dec. 14, 1948

2,456,431

UNITED STATES PATENT OFFICE 2,456,431

VALVE MEANS TO COMPENSATE FOR VISCOSITY IN HYDRAULIC SYSTEMS

Ralph E. Price, Highfield, Md., assignor to Landis Tool Company, Waynesboro, Pa.

Application November 8, 1940, Serial No. 364,921

5 Claims. (Cl. 60—52)

This invention relates to hydraulic systems, particularly for machine tools.

In the hydraulic operation of a machine it is generally desirable to be able to insure a uniform rate of movement of a driven part. However, variation in temperature of the hydraulic medium affects the viscosity thereof. Change in viscosity causes a change in the rate of movement of fluid thru pipe lines and any valves which may be used to control the rate of flow of said fluid, and hence the speed of the driven part.

The term constant or uniform speed, or flow of fluid as used hereinafter refers to this characteristic only so far as variation in viscosity is concerned. For changes in load or controlled changes in speed the invention described herein functions as a relief valve. To counteract such change in viscosity and to maintain a substantially constant speed of the driven part, a relief valve has been developed which will automatically adjust itself to increase or decrease the pressure in the system to correspond to any change in viscosity. In addition it will open to relieve excess pressure due to increase in load.

The resistance in a hydraulic circuit is composed of two elements, the friction of the driven part and the friction of the fluid in passing thru the system including valves for controlling the rate of flow of the fluid. The relief valve must maintain a pressure sufficient to overcome the frictional resistance to movement of the driven part plus whatever pressure is necessary to force fluid thru the system at the desired rate. As the viscosity of the fluid decreases due to increase in temperature thereof, the pressure required to maintain a selected speed is also reduced because of a drop in the resistance in the system. The resistance of the machine element, however, remains substantially constant regardless of change in viscosity. Thus we have one component of resistance varying with viscosity change, and another component remaining fixed under the same conditions. In order to maintain a substantially uniform movement of the driven part, the nature of the pressure on the system must correspond to the nature of the resistance to be encountered. Therefore, a spring is used in the by-pass relief valve to maintain sufficient pressure to balance the frictional resistance of the moving part. The additional pressure necessary to overcome resistance in the system must be built up in the form of a back pressure obtained by the resistance to flow of the total output of the pump thru a fixed opening. This pressure which is applied to the by-pass relief valve, along with the spring pressure described above, varies with any change in viscosity and therefore will cause a change in the setting of the by-pass relief valve for that portion of pressure which is responsive to change in viscosity. The spring, not being affected by viscosity change will continue to exert the same pressure on the by-pass relief valve.

Since the pressure required to move the driven part remains the same regardless of change in viscosity, and since the spring in the by-pass relief valve is designed to maintain this pressure, any variation in pressure due to variation in viscosity will affect only that portion of the pressure which causes the fluid to flow thru the system. Such variation in pressure will be effective to maintain said flow of fluid and therefore the movement of the driven part at a substantially constant rate. Thus a single valve is effective to regulate fluid pressure to overcome a fixed resistance as well as a variable resistance.

It is therefore an object of my invention to provide a by-pass relief valve which will maintain substantially constant, sufficient pressure to balance the frictional resistance of the part to be moved regardless of variation in viscosity of the fluid in the hydraulic system.

A further object is to provide means for maintaining uniform speed of a moving slide regardless of change in viscosity of the hydraulic medium.

A further object is to provide a by-pass relief valve mechanism having the combined function of maintaining a pressure to balance a constant load and also compensating for change in viscosity of the fluid for all pressures above said constant load, and to by-pass exhaust fluid above a pressure established by the setting of the hydraulic resistance plus the energy of the spring.

In order to function as a relief valve this device must by-pass oil when the pressure exceeds that for which the valve is set. In order to compensate for varying viscosity the pressure setting must vary with the viscosity. The fluid under pressure supplied by the pump moves a piston which moves a slide. The frictional resistance of this slide is fairly uniform. In order to move the piston however oil must be forced through a variable resistance by means of which the speed of the piston movement is controlled. The frictional resistance of the flow of the oil thru this variable resistance 28 is not uniform but varies with the viscosity of the oil which decreases as the oil becomes warmer and increases again after it has cooled during a shut down period.

To accommodate all these requirements the relief valve is made with a spring of proper proportions to take care of the fairly uniform load of the moving slide and also a means of varying the by-pass pressure controlled from the resistance of oil flow so that as the viscosity increases or decreases the pressure will be raised or lowered the proper amount to maintain a uniform flow through the speed controlling resistance. When the piston has reached the end of its movement the relief valve must open to by-pass the total output of the pump.

The single figure of the drawing is an end elevation of a grinding machine wheel base partly in section to show the motor for shifting same, and a diagram of the hydraulic apparatus and connections therefor.

In the drawings, numeral 10 indicates the bed of a grinding machine, 11 a wheel base slidably mounted thereon, and 12 a grinding wheel rotatably mounted on said wheel base. The means for shifting said wheel base is similar to that shown in Patent No. 2,243,405 granted May 27, 1941. It consists briefly of a cylinder 13 in the bed 10, having a piston 14 slidably mounted therein. Said piston has a rod 15 attached to a bracket 16 which in turn is attached to a sliding rack 17. Said rack engages a pinion 18 on the lower end of a vertical shaft 19 in wheel base 11. Said shaft may be rotated thru a worm 20 and a worm gear 21 by means of hand wheel 22. Since shaft 19 is locked by the worm and worm gear, movement of piston 14 results in movement of said shaft and therefore of the wheel base 11.

Fluid under pressure is directed from a reversing valve 25 thru lines 26 and 27 alternately to opposite ends of cylinder 13. A throttle valve 28 in line 26 controls the rate of flow of exhaust fluid from cylinder 13 and therefore the rate of the feeding movement of wheel 12. A check valve 29 in parallel with said throttle valve permits an unrestricted flow of fluid under pressure thru line 26 in the opposite direction.

Fluid under pressure is supplied to said reversing valve 25 by a pump 35 thru a conduit 36. A valve in parallel with said conduit consists of a housing 41 having concentric bores 42 and 43. A piston 44 has two diameters to fit said bores. A spring 45 bears against the small end of valve piston 44. The other end of said spring rests in a cup 46. The force exerted by said spring may be adjusted by screw 47. Connections 50 and 51 run from the small and large bores respectively to conduit 36. A throttle valve 55 in said conduit between connections 50 and 51 causes a difference in pressure between said connections and creates a back pressure in connection 50 for actuating valve piston 44. An exhaust passage 48 in the large bore 43 of housing 41 provides for the escape of excess fluid upon movement of valve piston 44.

Operation

Fluid under pressure is supplied to cylinder 13 or any other hydraulic mechanism from a pump 35 thru a conduit 36. Said fluid under pressure is applied to opposite ends of valve piston 44 thru lines 50 and 51 respectively. The throttle valve 55 in conduit 36 between lines 50 and 51 causes a difference in pressure between the two ends of the valve 44. The pressure exerted against the small end of valve piston 44 is in effect, the equivalent of a relief valve spring except that it varies under certain conditions such as change in viscosity of the fluid, whereas the force exerted by the spring 45 remains constant.

The pressure at the large end of valve 44 is limited by the pressure at which said valve will by-pass a portion of the fluid. This pressure in turn will vary with the force exerted at the small end of the valve. The force exerted at the small end of the valve consists of a fluid pressure $P_1$ which varies with changes in viscosity plus a spring pressure which correponds to the frictional resistance of the part to be moved and which remains substantially constant.

In order to explain more clearly the operation of this invention, a series of calculations is submitted. Symbols used in these calculations are accompanied by the corresponding reference numerals so that the relation of symbols to the structure may be clearly set forth.

$P_1$—pressure in line 50 on pump side of $R_1$
$P_2$—pressure in line 51 on piston side of $R_1$
$P_1-P_2=R_1$ or pressure drop across resistance 55
$P_3$—resultant pressure in line 26 derived from $$\frac{P_2 \times A_3 - L}{A_4}$$

$P_4=O=$pressure in exhaust line 48
$A_1$—area on small end of relief valve
$A_2$—area on large end of relief valve
$A_3$—piston area
$A_4$—piston area-rod area
$P_3-P_4=R_2$ or pressure drop across speed controlling resistance 28.
$R_1$—resistance 55 controlling the pressure at which the relief valve opens.
$R_2$—resistance 28 controlling the speed of oil flow from cyl. $A_4$ which in turn controls the speed of piston movement.
L—force required to balance resistance to movement of slide.

Following is an example of a relief valve maintaining pressure in the fluid flowing in a system to move a load of 200#. The valve is made, to compensate for viscosity changes of the oil, due to heating, so that as the viscosity decreases, the pressure decreases a proportionate amount in order to maintain a substantially uniform flow thru the lines and speed controlling resistance.

For convenience in calculation, the following values are assumed: $A_1=1$ sq. in.; $A_2=2$ sq. in.; $A_3=8$ sq. in.; $A_4=4$ sq. in.

Disregarding the load for the time being; as long as $P_1=P_2$ no pressure will be built up in the system beyond the several ounces required to slide the valve because as soon as $P_2 \times A_2 - P_1 \times A_1 =$ enough to slide the valve it will move to position where the oil is by-passed back into the reservoir. By increasing $R_1$ the pressure is caused to rise in $P_1$ in order to force the total output of the pump thru the reduced opening of $R_1$. The increased pressure $P_1$ acting on $A_1$ causes the pressure to rise in $P_2$ untill, due to the relative areas of $A_1$ and $A_2$, the pressure in $P_1$ is twice as great as the pressure $P_2$ and the difference between $P_1$ and $P_2$ is equivalent to the drop across $R_1$. $P_2$ is the pressure maintained by the relief valve for the work to be done. It is the pressure beyond which the relief valve opens and under which the relief valve closes.

Assuming a force L of 200# for moving piston 14 and slide 11, the value of the spring necessary to maintain pressure to balance said load may be determined as follows:

$$P_2 = \frac{L}{A_2} = \frac{200}{8} = 25 \text{\#/sq. in.}$$

When $R_1 = 0$ $P_1 = P_2$ so $P_1 = 25\text{\#/sq. in.}$ also $$P_1 \times A_1 + \text{spr. pres.} = P_2 \times A_2$$
$$25 \times 1 + \text{spr. pres.} = 25 \times 2$$
$$\text{spr. pres.} = 50 - 25 = 25\text{\#}$$

Now let us increase $R_1$ until $P_2 = 100\text{\#/sq. in.}$ $$P_2 \times A_2 = P_1 \times A_1 + \text{spr. pres.}$$
$$100 \times 2 = P_1 \times 1 + 25$$
$$P_1 = 200 - 25 = 175\text{\#/sq. in.}$$
$$R_1 = P_1 - P_2 = 175 - 100 = 75\text{\#/sq. in.}$$
$$P_3 = \frac{P_2 \times A_3 - L}{A_4} = \frac{100 \times 8 - 200}{4} = 150\text{\#/sq. in.}$$

Now if $R_2$ has twice the resistance value of $R_1$, since the pressure drop across $R_2$ is twice as great as across $R_1$ the same amount of oil will flow thru $R_2$ as thru $R_1$.

Now suppose, due to heating of the oil, and a consequent reduction in viscosity the pressure drop across $R_1$ is reduced from 75 to $50\text{\#/sq. in.}$ $$P_1 \times A_1 + \text{spr. pres.} = P_2 \times A_2 \quad 2P_2 - 25 = P_2 + 50$$
$$P_1 \times 1 + 25 = P_2 \times 2 \quad\quad P_2 = 75\text{\#/sq. in.}$$
$$P_1 = 2P_2 - 25 \quad\quad P_1 = 75 + 50 = 125$$
$$P_1 = P_2 + 50$$
$$P_3 = \frac{75 \times 8 - 200}{4} = 100\text{\#/sq. in.}$$

Thus it is shown that with a spring of sufficient load to supply that part of the pressure required to balance the load of the moving piston constant regardless of viscosity, the pressure drop across $R_2$ changes proportionally to the pressure drop across $R_1$ and since the flow thru $R_1$ remains constant the flow thru $R_2$ will remain constant for any given setting, and the speed of the piston will also remain constant.

Now assuming a different set of values, let $A_1 = 1.76$ sq. in.     $A_4 = 35.3$ sq. in.
$A_2 = 3.54$ sq. in.     $L = 3600\text{\#}$
$A_3 = 63.6$ sq. in.

to find the pressure value of the relief valve spring.

$$P_2 = \frac{3600}{63.6} = 56.6\text{\#/sq. in.}$$
$$R_1 = 0 \quad P_3 = 0$$
$$56.6 \times 1.76 + \text{spr. pres.} = 56.6 \times 3.54$$
$$\text{spr. pres.} = 56.6 \times 3.54 - 56.6 \times 1.76$$
$$\text{spr. pres.} = 200.364 - 99.616 = 100.748$$

Thus it is shown that by the use of the spring alone without any pressure drop across $R_1$ the pressure of the system will build up to $56.6\text{\#/sq. in.}$ which is just sufficient to balance the load of $3600\text{\#}$.

By increasing the resistance of $R_1$ the pressure in $P_1$ can be increased which will in turn increase the pressure in $P_2$ at which the relief valve will open, thus providing pressure in excess of that already supplied by the spring. This excess pressure results in a pressure at $P_3$ for causing a flow of oil thru $R_2$ and movement of the piston and load.

Let us assume that $R_1$ has been increased sufficiently to cause a pressure in $P_1$ of $100\text{\#/sq. in.}$ instead of $56.6\text{\#/sq. in.}$ already provided by the spring.

$$P_1 \times A_1 + \text{spring pressure} = P_2 \times A_2$$
$$100 \times 1.76 + 100.748 = P_2 \times 3.54$$
$$\frac{276.748}{3.54} = P_2$$
$$P_2 = 78.17$$
$$R_1 = P_1 - P_2$$
$$R_1 = 100 - 78.17 = \underline{21.83}$$
$$P_3 = \frac{P_2 \times A_3 - L}{A_4} = \frac{78.17 \times 63.6 - 3600}{35.3} = 38.85$$
$$R_2 = P_3 - P_4 = 38.85 - 0$$
$$R_2 = \underline{38.85}$$

Now let us assume that the oil has cooled and that, due to the increased viscosity, the pump being of constant displacement and the setting of $R_1$ unchanged, the pressure $P_1$ has increased to $150\text{\#/sq. in.}$ $$P_1 \times A_1 + \text{spring pressure} = P_2 \times A_2$$
$$150 \times 1.76 + 100.748 = P_2 \times 3.54$$
$$\frac{364.748}{3.54} = P_2$$
$$P_2 = 103.03$$
$$R_1 = P_1 - P_2$$
$$R_1 = 150 - 103.03 = 46.97$$

This represents an increase of pressure drop across resistance $R_1$ of $$\begin{array}{r} 46.97 \\ -21.83 \\ \hline 25.14 \text{ or } 53\frac{1}{2}\% \end{array}$$

$$P_3 = \frac{P_2 \times A_3 - L}{A_4} = \frac{103.03 \times 63.6 - 3600}{35.3} = 83.64$$
$$R_2 = P_3 - P_4 = 83.64 - 0$$
$$R_2 = 83.64$$

This represents an increase of pressure drop across resistance $R_2$ of $$\begin{array}{r} 83.64 \\ -38.85 \\ \hline 44.79 \text{ or } 53\frac{1}{2}\% \end{array}$$

which is the same percentage of increase already shown for $R_1$. This proves that any increase of resistance of $R_1$ due to a viscosity change of the oil, is reflected by a proportional increase in pressure drop across $R_2$. This is true only when a spring is used to augment the pressure of $P_1$ in order to supply pressure for the actual moving load.

As shown above, when $P_1 = 150\text{\#/sq. in.}$, $P_2 = 103.03\text{\#}$ per sq. in. when relief valve is in balance. When the piston reaches the end of its movement and pressure in $P_2$ exceeds $103.03\text{\#/sq. in.}$ the valve will open and by-pass the total output of the pump.

To illustrate let us assume that the pressure drop across resistance $R_1$ is $46.97\text{\#/sq. in.}$ as in the last condition demonstrated.

Then if $P_2$ exceeds $103.03\text{\#/sq. in.}$ due to the stopping of the movement of the piston the valve must open.

Assuming that $P_2 = 103.03 + 10$ or $113.03\text{\#/sq. in.}$
The force against $A_2 = 113.03 \times 3.54 = 400.12$
The force against $A_1 = (113.03 + 49.97) \times 1.76 + 100.748 = 387.63$ Since $A_2 = 400.12 + A_1 = 387.63$ the valve is urged to open by a force of $$\begin{array}{r} 400.12 \\ -387.63 \\ \hline 12.49\# \end{array}$$

Thus it has been illustrated that the device functions as a relief valve when $P_2$ exceeds the pressure established by the setting of resistance of $R_1$ and the spring pressure. In addition, the variations of resistance $R_1$ due to varying viscosities causes a proportionate variation in $P_3$ which governs the rate of flow thru $R_2$ and hence the movement of the piston.

I claim:

1. In a hydraulic system, a motor and a mechanism actuated thereby, a constant delivery pump for supplying fluid under pressure to said motor, a conduit for conducting the fluid to said motor, a throttle valve in said conduit, a pressure operated relief valve, the area of one end of said relief valve being smaller than the area of the other end, a connection from said conduit ahead of said throttle valve to said smaller area, a connection from said conduit beyond the throttle valve to said larger area, a discharge port at the large area end of the relief valve located so that the size of said port opening is regulated by movement of said valve, means to control the speed of said motor including a second throttle valve located in an exhaust passage from said motor, and resilient means operable on the small area end of said relief valve and supplementing said pump pressure.

2. In a hydraulic system, a motor and a mechanism actuated thereby, a constant delivery pump for supplying fluid under pressure to said motor, a conduit for conducting the fluid to said motor, a throttle valve in said conduit, a pressure operated relief valve, the area of one end of said relief valve being smaller than the area of the other end, a connection from said conduit ahead of said throttle valve to said smaller area, a connection from said conduit beyond the throttle valve to said larger area, a discharge port at the large area end of the relief valve located so that the size of said port opening is regulated by movement of said valve, means to control the speed of said motor including a second throttle valve located beyond the connection that connects the large area end of said valve to the said conduit and resilient means operable on the small area end of said relief valve and supplementing said pump pressure.

3. In a hydraulic system, a motor and a mechanism actuated thereby, said mechanism having a substantially constant resistance to movement, a constant delivery pump for supplying fluid under pressure to said motor, a conduit for conducting the fluid to said motor, a throttle valve in said conduit, a pressure operated relief valve, the area of one end of said relief valve being smaller than the area of the other end, a connection from said conduit ahead of said throttle valve to said smaller area, a spring operable on the small end of said valve along with said fluid under pressure for maintaining a constant pressure corresponding to said constant resistance, a connection from said conduit beyond the throttle valve to said larger area, a discharge port at the large area end of the relief valve located so that the size of said port opening is regulated by movement of said valve and means to control the speed of said motor including a second throttle valve located beyond the connection that connects the large area end of said valve to the said conduit.

4. In a hydraulic system, a motor and a mechanism actuated thereby having a substantially constant resistance to movement, a constant delivery pump for supplying fluid under pressure to said motor, a conduit for conducting said fluid to said motor, means for compensating for variation in viscosity of the fluid in said system including a by-pass relief valve having different areas at opposite ends thereof and having connections to said conduit from each end thereof, a throttle valve in said conduit between said connections, the smaller end of said valve being connected to said conduit ahead of said throttle valve, the larger end of said valve being connected to said conduit beyond said throttle valve, a discharge passage in the large area end of said by-pass relief valve, a second throttle valve beyond the connection to the large area end of said relief valve for adjusting the speed of said motor, and resilient means unaffected by change in fluid viscosity and operable on the small area end of said relief valve supplementing said pump pressure and sufficient for maintaining a pressure corresponding to said constant resistance.

5. In a hydraulic system, a motor and a mechanism actuated thereby, a constant delivery pump for supplying fluid under pressure to said motor, a conduit for conducting said fluid to said motor, means for compensating for variation in viscosity of the fluid in said system including a by-pass relief valve having different areas at opposite ends thereof and having connections to said conduit from each end thereof, a throttle valve in said conduit between said connections, the smaller end of said relief valve being connected to said conduit ahead of said throttle valve, the larger end of said relief valve being connected to said conduit beyond said throttle valve, a discharge passage in the large area end of said by-pass relief valve, and a second throttle valve beyond the connection to the large area end of said relief valve for adjusting the speed of said motor.

RALPH E. PRICE.

REFERENCES CITED

The following references are of record in the file of this patent:

UNITED STATES PATENTS

| Number | Name | Date |
| --- | --- | --- |
| 1,467,522 | Amsler | Sept. 11, 1923 |
| 1,884,277 | Sassen | Oct. 25, 1932 |
| 1,943,527 | Hayes | Jan. 16, 1934 |
| 1,972,462 | Schafer | Sept. 4, 1934 |
| 2,004,522 | Douglas | June 11, 1935 |
| 2,005,731 | Ernst et al. | June 25, 1935 |
| 2,005,732 | Ernst et al. | June 25, 1935 |
| 2,006,311 | Ernst et al. | June 25, 1935 |
| 2,028,766 | Ernst et al. | Jan. 28, 1936 |
| 2,032,430 | Muller | Mar. 3, 1936 |
| 2,073,070 | Lewis | Mar. 9, 1937 |
| 2,102,865 | Vickers | Dec. 21, 1937 |
| 2,111,964 | Crane | Mar. 22, 1938 |
| 2,166,940 | Conradson | July 25, 1939 |
| 2,206,523 | Anderson | July 2, 1940 |

FOREIGN PATENTS

| Number | Country | Date |
| --- | --- | --- |
| 399,609 | Great Britain | Oct. 12, 1933 |